United States Patent
Aggarwal et al.

(10) Patent No.: US 10,242,269 B2
(45) Date of Patent: Mar. 26, 2019

(54) OCCUPANT POSITION TRACKING USING IMAGING SENSORS

(71) Applicants: Anant Aggarwal, Waltham, MA (US); Yang Li, Georgetown, MA (US); Sajin George, Somerville, MA (US); Christian Breuer, North Rhine-Westphalia (DE)

(72) Inventors: Anant Aggarwal, Waltham, MA (US); Yang Li, Georgetown, MA (US); Sajin George, Somerville, MA (US); Christian Breuer, North Rhine-Westphalia (DE)

(73) Assignee: OSRAM SYLVANIA Inc., Wilmington, MA (US)

( * ) Notice: Subject to any disclaimer, the term of this patent is extended or adjusted under 35 U.S.C. 154(b) by 72 days.

(21) Appl. No.: 15/437,521

(22) Filed: Feb. 21, 2017

(65) Prior Publication Data

US 2018/0239965 A1 Aug. 23, 2018

(51) Int. Cl.
*H04N 5/33* (2006.01)
*G06K 9/00* (2006.01)
(Continued)

(52) U.S. Cl.
CPC ........ *G06K 9/00771* (2013.01); *G01J 1/0238* (2013.01); *G01J 1/0266* (2013.01);
(Continued)

(58) Field of Classification Search
None
See application file for complete search history.

(56) References Cited

U.S. PATENT DOCUMENTS

| 7,978,881 B2 | 7/2011 | Aoki et al. |
| 2007/0002304 A1 | 1/2007 | Saltsman |

(Continued)

FOREIGN PATENT DOCUMENTS

EP 3021502 A1 5/2016

OTHER PUBLICATIONS

Hekmat, Taymoor, International Search Report and Written Opinion of the International Searching Authority, for counterpart application PCT/US2018/014312, dated May 22, 2018, European Patent Office, Rijswijk, The Netherlands, 13 pages.

(Continued)

*Primary Examiner* — Eileen M Adams
(74) *Attorney, Agent, or Firm* — Yutian Ling

(57) ABSTRACT

Techniques are disclosed for locating an occupant within an area. The system includes a first sensor including a first plurality of pixels for receiving a thermal energy input from the occupant within a first field of view (FOV) and a second sensor including a second plurality of pixels for receiving the input within a second FOV. A first distance from the occupant to the first sensor is determined based on the input received by at least one pixel of the first plurality of pixels and a first sensor location from an origin. A second distance from the occupant to the second sensor is also determined based on the input received by at least one pixel of the second plurality of pixels and a second sensor location relative to the origin. A coordinate position for the occupant relative to the origin is determined based on the determined first and second distances.

18 Claims, 11 Drawing Sheets

(51) Int. Cl.
*G01J 1/42* (2006.01)
*G01J 1/02* (2006.01)
*G01S 5/16* (2006.01)

(52) U.S. Cl.
CPC ............ *G01J 1/4228* (2013.01); *G01S 5/16* (2013.01); *H04N 5/33* (2013.01)

(56) References Cited

U.S. PATENT DOCUMENTS

| | | | |
|---|---|---|---|
| 2009/0242769 A1 | 10/2009 | Luterotti et al. | |
| 2011/0184288 A1 | 7/2011 | Kawabata et al. | |
| 2013/0107245 A1* | 5/2013 | Covaro | G08B 13/191 356/51 |
| 2015/0228419 A1* | 8/2015 | Fadell | G08B 17/00 307/112 |
| 2016/0173794 A1* | 6/2016 | Beck | H04N 5/361 348/244 |

OTHER PUBLICATIONS

Song, Byunghun, et al., "Surveillance Tracking System Using Passive Infrared Motion Sensors in Wireless Sensor Network," IEEE International Conference on Information Networking 2008, Jan. 23, 2008, p. 1-5.

* cited by examiner

OCCUPANT POSITION TRACKING USING IMAGING SENSORS

FIELD OF THE DISCLOSURE

This disclosure relates to presence detection techniques, and more particularly to occupancy detection systems configured to determine a coordinate position for an occupant within an area.

BACKGROUND

Occupancy detection systems are commonly used to identify the presence of a human occupant, within an area. These systems use a sensor, such as an infrared (IR) or an acoustic sensor, to identify the presence of an occupant using temperature or reflected acoustic signal patterns. By monitoring the signal as a function of time, the sensor determines changes in the occupancy level of the area.

SUMMARY

One example embodiment of the present disclosure provides a system for locating an occupant within an area, the system including: a first sensor positioned in an area and at a first location relative to a reference point in the area, the first sensor including a first field of view; a second sensor positioned in the area and at a second position relative to the reference point, the second sensor including a second field of view, such that the second field of view overlaps the first field of view; a computing system in communication with the first sensor and the second sensor, wherein the computing system is configured to determine a first distance from the first sensor to the occupant based on detection signals from the first sensor, determine a second distance from the second sensor to the occupant based on detection signals from the second sensor, and determine a coordinate position of the occupant relative to the reference point based on the determined first distance and the determined second distance. In some instances, the first sensor is positioned orthogonal to the second sensor. In other instances, the first field of view and the second field of view overlap to define a portion of the area, the portion of the area containing the coordinate position. In other instances, the system includes a communication network connected to the first sensor and the second sensor and the computing system, wherein the first sensor and the second sensor are placed in communication with the computing system via the network.

Another example embodiment of the present disclosure provides a method for locating an occupant within an area, the method including: receiving a first thermal energy input from the occupant within a first field of view of a first sensor, the first sensor being located a known distance from a reference point in the area; receiving a second thermal energy input from the occupant within a second field of view of a second sensor, the second sensor being located a known distance from the reference point in the area; determining a first distance from the occupant to the first sensor based on the first thermal energy input received by the first sensor; determining a second distance from the occupant to the second sensor based on the second thermal energy input received by the second sensor; and determining a coordinate position of the occupant in the area relative to the reference point based on the determined first distance and the determined second distance. In some cases, the first thermal energy input may be received by at least one pixel in a first plurality of pixels of the first sensor, and the second thermal energy input may be received by at least one pixel in a second plurality of pixels of the second sensor. In some cases, determining the first distance from the occupant to the first sensor further includes determining an azimuth angle between a reference axis and a line of sight from the first sensor to the occupant based on: a field of view of the first sensor; a field of view of a pixel in the first plurality of pixels of the first sensor; and a pixel number associated with the pixel of the first plurality of pixels. In some such cases, the pixel number is based on a position of the pixel in the first plurality of pixels receiving the thermal energy input. In some cases, the first and second thermal energy inputs are simultaneously received within the first field of view of the first sensor and the second field of view of the second sensor, respectively. In yet some other cases, the coordinate position of the occupant is determined for a single occupant, and the single occupant is selected from a plurality of occupants within the area. In some other cases, the method includes tracking movement of the occupant in the area based on multiple determined coordinate positions. In yet other cases, the method includes providing an instruction to a controller in the area corresponding to the determined coordinate position of the occupant. In some cases, the controller may include at least one of a lighting controller, an environmental controller, and a security controller. In other cases, determining a coordinate position of the occupant in the area relative to the reference point includes converting the determined first distance and the determined second distance to a coordinate position based on a first azimuth angle associated with the first sensor and a second azimuth angle associated with the second sensor.

Another example embodiment of the present disclosure provides computer program product comprising one or more non-transitory machine readable mediums encoding a plurality of instructions that when executed by one or more processors cause a process to be carried out for determining a location of an occupant within an area, the process including: determining a first distance from the occupant to a first sensor based on a first thermal energy input received by the first sensor and a known location of the first sensor relative to a reference point within the area; determining a second distance from the occupant to a second sensor based on a second thermal energy input received by the second sensor and a known location of the second sensor relative to the reference point, the first and second sensors being located at different locations within the area; and determining a coordinate position of the occupant in the area relative to the reference point based on the determined first distance and the determined second distance. In some cases, the first thermal energy input may be received by at least one pixel in a first plurality of pixels of the first sensor, and the second thermal energy input may be received by at least one pixel in a second plurality of pixels of the second sensor. In some cases, determining the first distance from the occupant to the first sensor further includes determining an azimuth angle between a reference axis and a line of sight from the first sensor to the occupant based on: a field of view of the first sensor; a field of view of a pixel of the first plurality of pixels of the first sensor; and a pixel number associated with the pixel in the first plurality of pixels. In some such cases, the pixel number is based on a position of the pixel in the first plurality of pixels receiving the thermal energy input. In yet some other cases, the first and second thermal energy input are simultaneously received within the first field of view of the first sensor and the second field of view of the second sensor, respectively. In other cases, the process includes tracking movement of the occupant in the area based on multiple determined coordinate positions. In some such cases, the process includes comprising providing an instruction to a controller in the area corresponding to the determined coordinate position of the occupant, the controller being at least one of a lighting controller, an environmental controller, and a security controller. In some cases, determining a coordinate position of the occupant in the area relative to the reference point includes converting the determined first distance and the determined second distance to a coordinate position based on a first azimuth angle associated with the first sensor and a second azimuth angle associated with the second sensor.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1A:
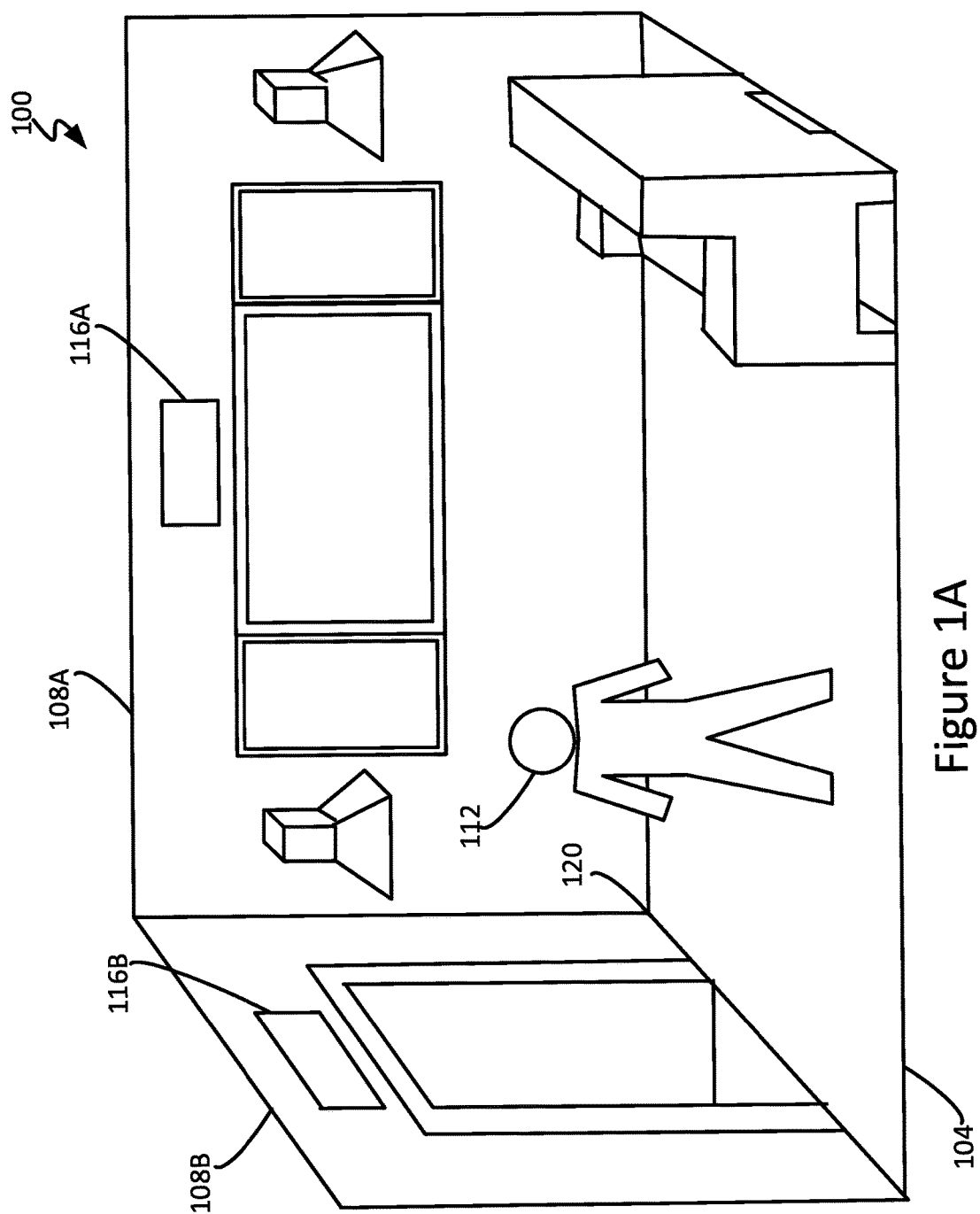
FIG. 1A is a perspective view of an area configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architecture are disclosed for locating an occupant within an area. The area may include two or more sensors, each of which is disposed within the area relative to an origin. The first sensor includes a first plurality of pixels defining a first field of view (FOV) for receiving a thermal energy input from the occupant. In response to receiving the input, the first sensor generates a detection signal that is used for determining a first distance to the occupant in a first direction. The system also includes a second sensor with a second plurality of pixels defining a second FOV for receiving the thermal energy input. The second sensor generates a detection signal that is used for determining a second distance to the occupant in a second direction that is different from the first direction. A coordinate position of the occupant relative to the origin is determined from the determined first and second distances, as well as sensor position data (e.g., distances from each sensor to the origin) programmed or otherwise received by the system. The origin is a reference that establishes a geometric relationship (e.g., a first wall having the first sensor, a second wall having the second sensor, and the floor, all mutually orthogonal to one another) that can be used to determine a coordinate position for the occupant therefrom. The determined coordinate position of the occupant may be used, for example, to automatically adjust environmental conditions or otherwise make localized decisions with respect to the area (e.g., turn lighting on/off, adjust air conditioning, or notify security of intruder/breach conditions) to provide a safe, efficient, and comfortable environment for the occupant. Numerous lighting applications and embodiments will be apparent in light of this disclosure.

General Overview

Occupancy detection systems often include sensors that identify presence, but not the location, of an occupant within an area. No matter whether the sensor is a passive infrared (PIR) or an acoustic sensor, these sensors determine whether the occupant is within a field of view (FOV) of the sensor. Detecting presence, however, is not the same as determining a location of the occupant within the area. For instance, a sensor may detect a person within its FOV, but that FOV may include several different locations within the area. The occupant, thus, may be located in any one of these different locations. The sensors, therefore, cannot determine the location of the occupant, but rather merely identify that the occupant is within its FOV. Using a sensor to effectively and efficiently control lighting components and other devices, it would be beneficial for a sensor to produce data that could be used to identify a location of an occupant within an area.

Thus, and in accordance with an embodiment of the present disclosure, techniques and architectures are disclosed for identifying a location of an occupant within an area, such as a room of a home or building. The area may include, for example, a floor and two or more walls, in which at least two walls each have a sensor affixed thereto and located a distance from an origin. The origin is a reference, such as the point where the two walls and the floor meet, and provides a frame of reference to determine a coordinate position (e.g., (x, y) coordinates) for the occupant. Each sensor is located at a known distance and location relative to the origin. The system further includes a computing system or processor or controller that is configured to determine the coordinate position for the occupant relative to the origin based on detection signals from the first and second sensors.

The first sensor includes a first plurality of pixels defining a first field of view (FOV) for receiving a thermal energy input from the occupant. A FOV is the angle through which the sensor may detect a thermal energy input. A thermal energy input is thermal energy (e.g., infrared radiation) emitted by an occupant within the FOV of the sensor and received by one or more pixels of the sensor. In some embodiments, the first sensor may be, for example, a thermopile sensor with a 16×4 array of pixels, although numerous sensor configurations can be used as will be appreciated. Each pixel of the array is uniquely identified (e.g., numbered 1 to 64) using a pixel index and a pixel reference point (e.g., right-hand side of the sensor). The first sensor is configured to generate electrical signals in response to receiving the thermal energy input at one or more of the pixels. These electrical signals are processed to select a pixel number associated with a pixel (e.g., the pixel receiving the largest input).

With the pixel number selected, the distance from the first sensor to the occupant (i.e., occupant position data) can be determined based on the sensor position data using geometric relationships among the system components (e.g., the relationship of the sensors about the origin) and known or otherwise derived system attributes (e.g., the pixel number), as further described below. Sensor position data, such as distances between sensors, to the origin, and above the floor, create relationships of the sensors relative to one another, the area (e.g., the origin and reference axes) and/or an occupant. This data can be received by the system and used, along with generated electrical signals of each sensor, to determine a coordinate position of the occupant within the area, as further described herein.

The system also includes a second sensor with a second plurality of pixels defining a second FOV for receiving the thermal energy input. The second sensor may be configured in a similar fashion to the first sensor, so as to generate electrical signals in response to receiving the thermal energy input at one or more of the pixels. The signals generated by the second sensor, along with sensor position data, can be used to determine a second distance from the occupant to the second sensor in a second direction, different from the first direction. In some embodiments, the second sensor is positioned mutually orthogonal to the first sensor and the floor about the origin, such that FOV of the second sensor overlaps at least some of the FOV of the first sensor. With the occupant located in a portion of the area defined by the second FOV overlapping the first FOV, the system can triangulate the position of the occupant within the area. Other geometric room layouts can be used as well, and the methodologies provided herein can be calibrated to compensate for that particular geometric layout. In this way, any given room design can be normalized to a room having three mutually orthogonal surfaces (two walls and a floor) that meet at a reference point (origin).

Using the occupant position data (e.g., the determined first and second distances), the system is configured to determine a coordinate position for the occupant relative to the origin. In one example embodiment, the coordinate position is automatically determined based on one or more geometric relationships between system components (e.g., the sensors and origin) and the thermal energy inputs, as described below. The determined coordinates are real time occupant positions within the area and thus, can be used to track the occupant within the area and to perform localized actions within the area, as variously described herein.

In some embodiments, for instance, the sensors may be part of a lighting system that includes a communications network and controllers. In one example embodiment, the network is used to facilitate communication between the sensors and controllers in response to detecting an occupant and determining a coordinate position. In some embodiments, the system may include a computing system configured to receive and process the information from the sensors and in turn provides operating instructions/commands for performing one or more local actions using one of the controllers (e.g., lighting, environmental, and security controllers). Some local actions may include turning on or off light fixtures, adjusting temperature settings, and activating and deactivating security sensors. With the instructions/commands received, the controllers may adjust one or more conditions for the area based on the determined coordinate position for the occupant.

Example Occupant Position Tracking Application

FIG. 1A is a perspective view of an area 100, which can be any structure or spatial environment in which human occupancy is monitored. Knowing whether one or more occupants are present in the area 100 may allow the system to localize decisions for adjusting or varying conditions or security postures of the area 100, such as, lighting, climate, or security conditions. As can be seen, the area 100 includes a floor 104, walls 108A and 108B, sensors 116A and 116B and an origin 120.

As will be explained in more detail below, the floor 104 (along with the origin 120) provides a frame of reference for identifying the location of the occupant 112 within the area 100. Using this frame of reference, occupant position data from each sensor 116A, 116B (e.g., the occupant distances from each sensor) are converted into a coordinate position on the floor 104. As previously discussed, current presence detection techniques cannot identify a coordinate position of an occupant 112 within the area 100 because the occupant 112 may be located in one of several positions within the area 100 and still be detected by the sensor. Thus, any local decisions to change one or more light, climate or security conditions based on data from a single sensor, may be inaccurate and/or ineffective because the occupant 112 may not be located in a specific position within the floor 104 to experience those changes.

The walls 108 include two sensors 116A and 116B (collectively referred to as sensors 116) configured to receive the thermal energy emitted from occupants 112 (i.e., the thermal energy input). As can be seen in FIG. 1A, the sensors 116 are mounted to walls 108, such that the sensors 116 are positioned at a distance above the floor 104. In an example embodiment, the sensors 116 are mounted to walls 108 at a uniform distance above the floor 104. In other embodiments, however, the sensors 116 may be located at varying heights above the floor 104. The detection signal generated by the sensors 116A and 116B, along with sensor position data, are used to determine the distance of an occupant 112 from the sensors 116 (i.e., occupant position data). The sensors 116 may include a number of pixels for receiving thermal energy inputs from the occupant 112. In some instances, the sensors 116 may receive the thermal energy input simultaneously, for example when the occupant 112 is located the same distance away from each sensor 116. In yet other instances, the thermal energy input may be received at different times based on the configuration of the system (e.g., differing sensor locations) and/or the position of the occupant 112 within the area 100 (e.g., occupant 112 located closer to one sensor 116 than another). Upon receiving the thermal energy input, in some embodiments, the sensors 116 are configured as intelligent sensors that include hardware, such as processors and memory, and software for determining a distance from the sensors 116 to the occupant 120 using the detection signal. In such embodiments, sensors 116 are programmed with information (e.g., distance from the sensor 116 to the origin 120) regarding the layout and configuration of system components to enable the sensors 116 to determine their distance to the occupant 112. In other embodiments, where less sophisticated sensors are desired, the sensors 116 are configured to transmit the detection signals to a computing system, controller or other suitable computing device for determining distances from the sensors 116 to the occupant 112, as further described herein.

Together the floor 104 and the origin 120 make up the frame of reference used to determine a coordinate position of the occupant 112, as explained herein in more detail. The coordinate position of the occupant 112 within the floor 104 is determined in relation to origin 120, for example, 10 feet (ft) from the origin 120 in a first direction (i.e., y-direction) and 10 ft from the origin 120 in a second direction (i.e., x-direction). As can be seen in this instance, the origin 120 is located at the corner of the area 100 where the two walls 108 abut or meet. As described below, the location of the origin 120 creates a geometric relationship among the sensors 116 and the origin 120 that can be used to determine a coordinate position of the occupant 112. Numerous other origin locations may be implemented in light of this disclosure.

Figure 1B:
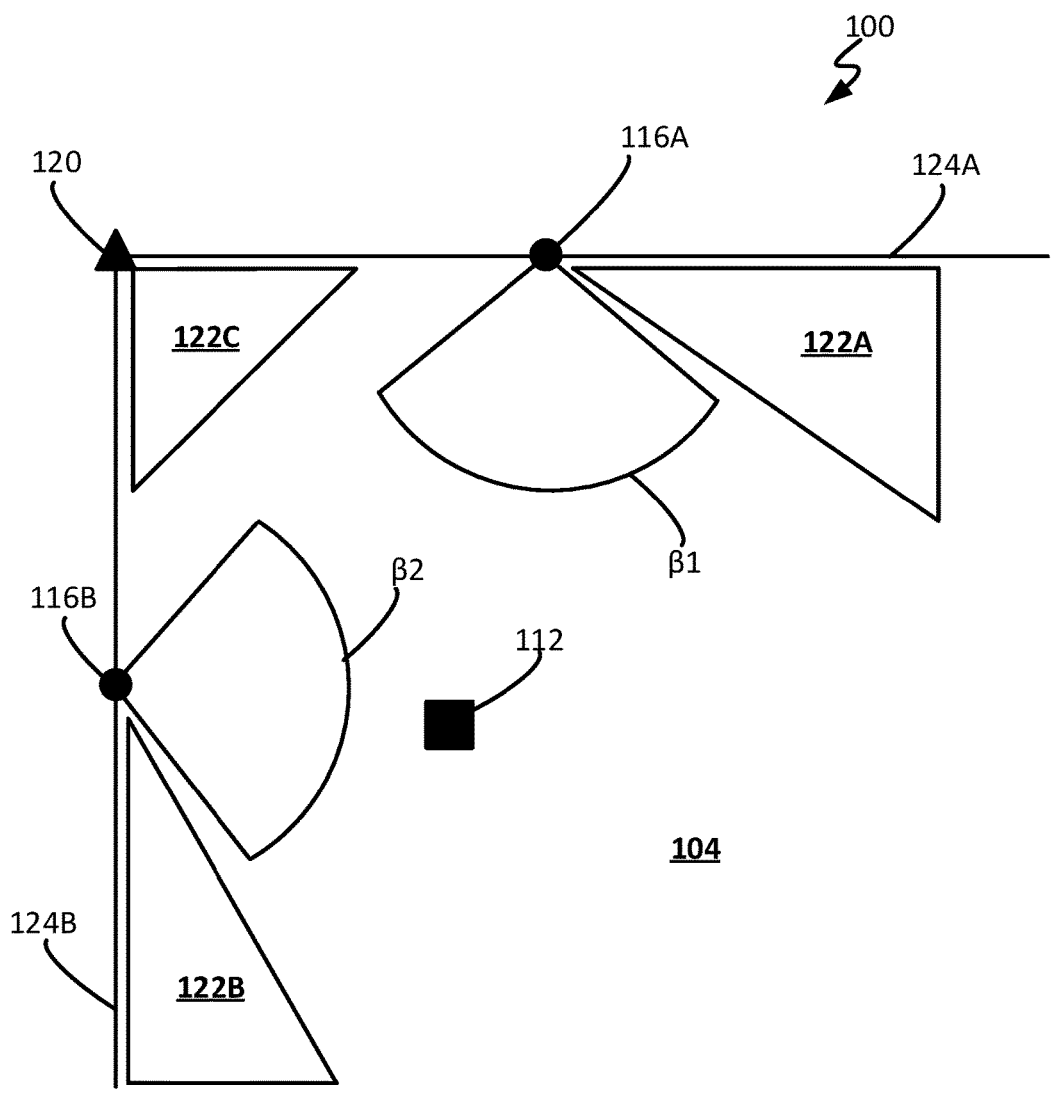
FIG. 1B is a schematic view of the area configured in accordance with an embodiment of the present disclosure.

FIG. 1B is a schematic view of the floor 104 illustrating overlapping fields of views (FOV) β1 and β2 (collectively FOV β) of the sensors 116A and 116B, respectively, within the area 100 defined by a horizontal axis 124A and a vertical axis 124B (collectively reference axes 124), in accordance with an embodiment of the present disclosure. The system is configured to determine not only presence of the occupant 112 within the area 100, but also a coordinate location of the occupant 112 based on the FOV β of the sensors 116, as described herein.

Each FOV β is an angle through which the sensor 116 can receive a thermal energy input (e.g., electromagnetic radiation). The specific location of the occupant 112 within the area 100 can be determined when two or more sensors 116 receive thermal energy emitted from the occupant 112 within a different FOV β for each sensor 116. For instance, in the example shown, the system is configured to determine a coordinate position of the occupant 112 when the sensors 116A, 116B receive thermal energy from the occupant 112 via FOV β1 and β2 respectively. For both sensors 116 to receive thermal energy from the occupant 112, the occupant 112 should be located within a portion of the area 100 where FOV β1 and β2 overlap with one another. In this example case, FOV β1 is orthogonal to FOV β2 and thus defining a portion of the area 100 wherein both sensors 116 can detect the occupant 112. In a more general sense, FOV β1 and β2 may overlap one another in any manner, so long as FOV β1 and β2 are different from one another (e.g., the FOVs include different portions of the area 100). System accuracy is maximized when the sensors 116 are located, such that FOV β1 and β2 are offset from one another along different directions, for example when sensors are orthogonal to one another. When the occupant 112 is located in certain locations in the area 100, such as 122A, 122B and 122C, the occupant 112 is located outside the FOV β of at least one, if not both, sensors 116 and thus, a coordinate position cannot be determined for the occupant 112 because the system receives occupant position data in one direction relative to the origin 120.

Reference axes 124 of the area 100 intersect one another at the origin 120. The reference axes 124 establish a relationship between the origin 120 and the sensors 116 for the purpose of determining a coordinate position for the occupant 112 on the floor 104 of the area 100. The reference axes 124 provide a reference plane, in which angles are determined from the axes 124 to one or more lines of sight from the sensors 116. These angles are used to determine distances from the sensors 116 which in turn, can be used to identify a coordinate position of the occupant 112, as described herein.

System Architecture and Operation

Figure 2:
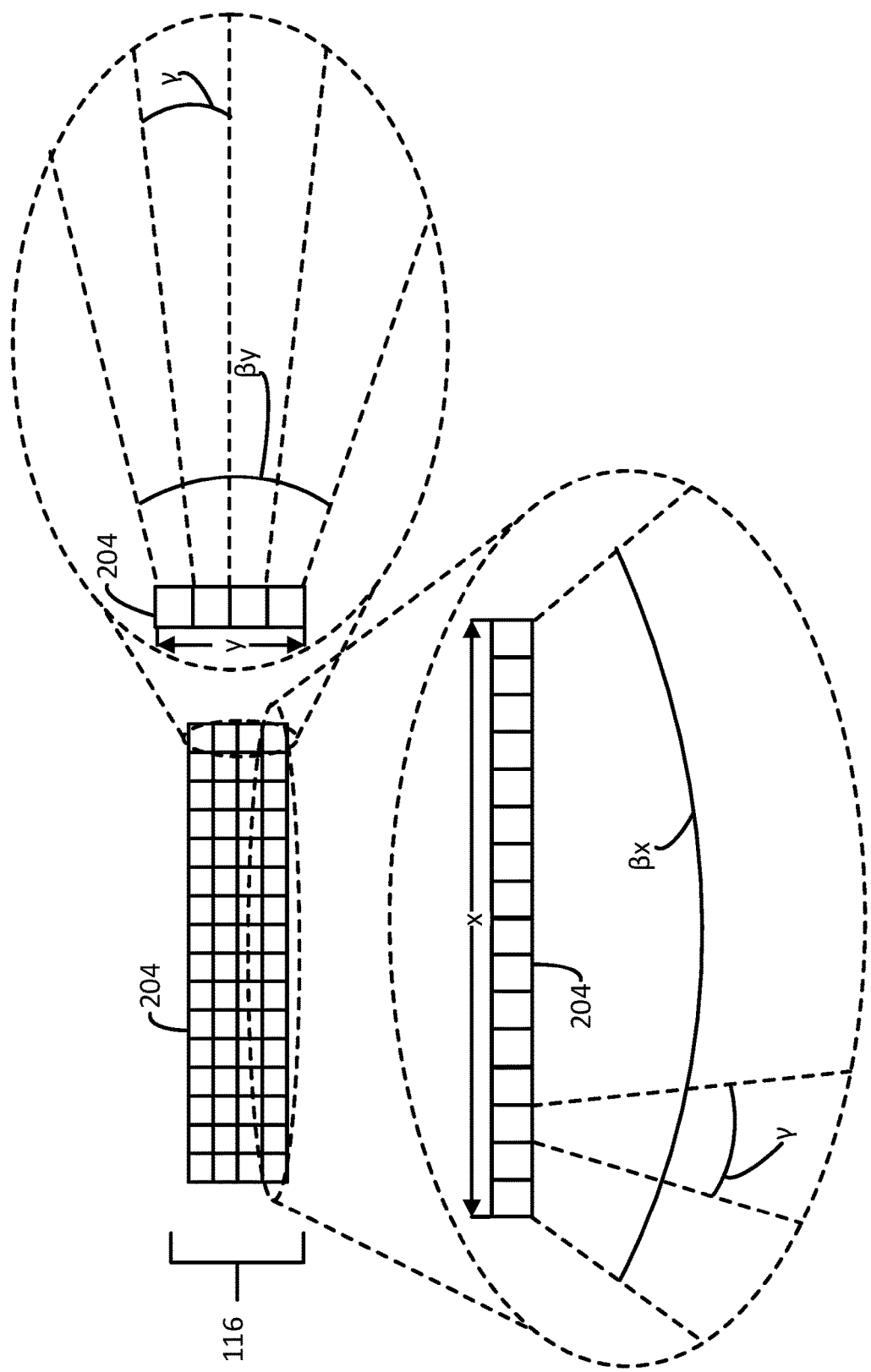
FIG. 2 is a schematic view of a sensor including an array of pixels configured in accordance with an embodiment of the present disclosure.

FIG. 2 is a schematic view of a sensor 116 having a number of pixels 204 arranged in a grid formation and configured to receive a thermal energy input from an occupant, and to generate a corresponding detection signal. In an example embodiment, the sensor 116 is a thermopile sensor with a 16×4 array of pixels 204. This type of sensor minimizes environmental intrusion into the area because the sensor can be embedded into walls, ceilings, or light fixtures and thus, the surface containing the pixels 204 (i.e., the sensor surface) is exposed to the area. The pixels 204 receive the thermal energy emitted by an occupant within the FOV β of the sensor 116, as previously described. In a first direction, a group of vertically oriented pixels 204 has a vertical FOV βy based on the FOV per pixel γ in the y-direction. In a second direction, a group of horizontally oriented pixels 204 has a horizontal FOV βx based on the FOV per pixel γ in the x-direction.

Using one or more pixels 204 along the vertical FOV βy or horizontal FOV βx, a coordinate position for an occupant can be determined, as described herein. For instance, the system in some embodiments is configured to select FOV βx in response to the occupant moving across the floor. In this case, the sensor 116 has sixteen pixels 204 in the horizontal direction and four pixels 204 in the vertical direction. By selecting the FOV βx the sensor 116 can more accurately detect occupant movements along the floor because the sixteen horizontal pixels 204 may monitor more locations along the floor than the vertical pixels 204. In other instances, the occupant may be traveling above the floor, for example climbing a set of stairs. In such an instance, the system may be configured to select FOV βy because vertical pixels 204 may monitor several locations above the floor of the area. In a more general sense, note that the system is configured to select the FOV that provides the greatest number of pixels 204 for tracking the occupant.

The FOV per pixel γ, mentioned above, is also used to determine a coordinate position for the occupant. The FOV per pixel γ is used to calculate angles, such as azimuth angle ξ (as described below), for determining a coordinate position of the occupant relative to the origin. The FOV per pixel γ is determined based on the number of pixels 204 in a given direction (e.g., x or y) for a sensor 116 and the FOV β for the selected direction (e.g., βx or βy). In this instance, for example, the sensor 116 includes a 16×4 array of pixels having a FOV βx of 60° and FOV βy of 15°, as identified by the sensor manufacturer. The FOV per pixel γ in the x-direction is determined by dividing FOV βx by the number of pixels 204 in the x-direction (i.e., sixteen pixels). Thus, in this instance FOV per pixel γ in the x-direction is approximately 4° per pixel. In the y-direction, the FOV per pixel γ is approximately 4° per pixel. In a more general sense, note that the FOV per pixel γ is dependent on the pixel configuration and FOV of the sensor 116.

Figure 3:
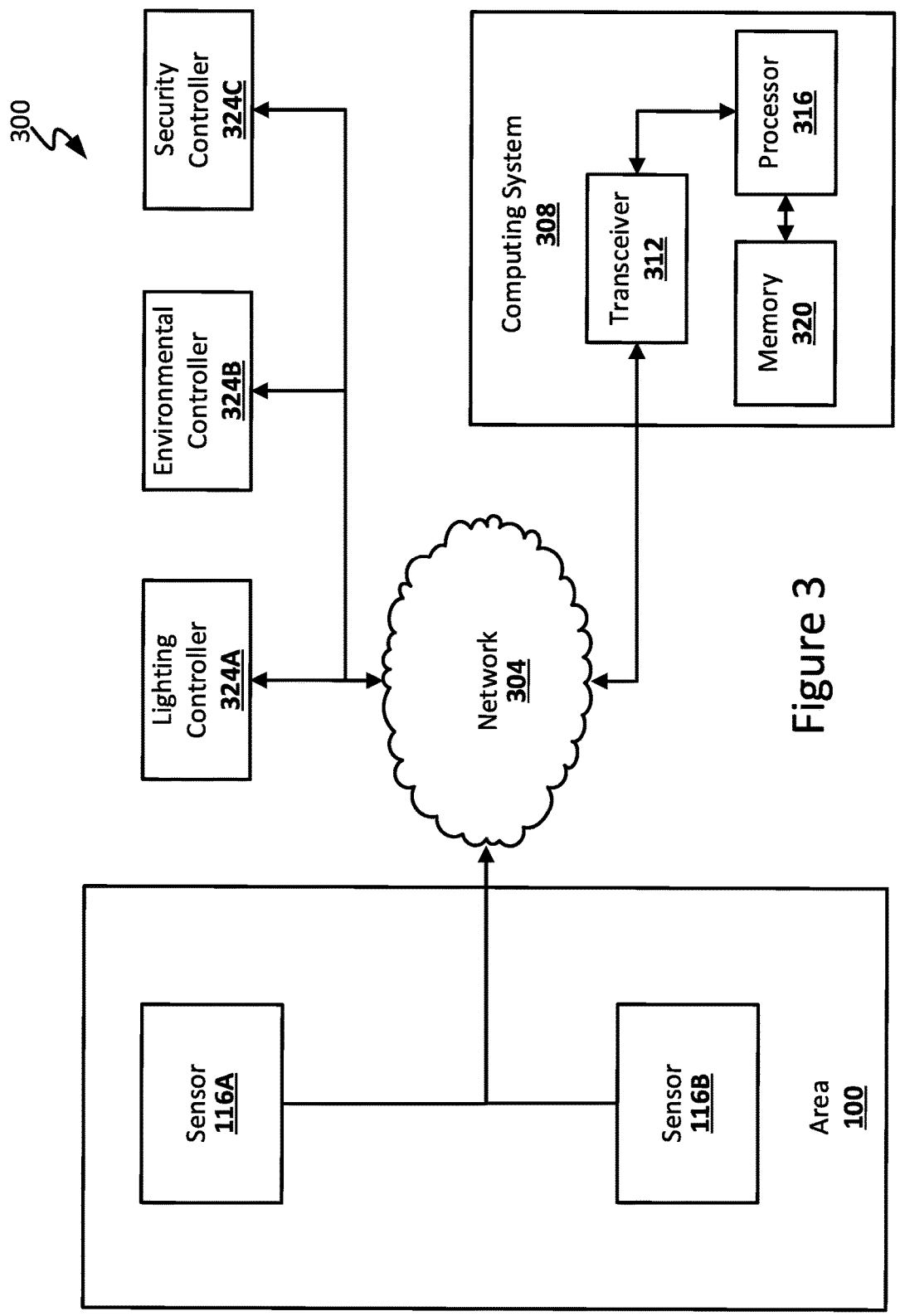
FIG. 3 is a block diagram of a system configured in accordance with an embodiment of the present disclosure.

FIG. 3 is a block diagram of a system 300 configured to determine a coordinate position of an occupant within the area 100, in accordance with an embodiment of the present disclosure. The system includes an area 100, a network 304, a computing system 308, and controllers 324A, 324B, 324C (collectively 324).

The area 100 includes sensors 116 for receiving thermal energy, as previously described with respect to FIG. 1A. In some cases, the area 100 may include more than two sensors 116 to increase system accuracy. Having more sensors 116 may improve system accuracy and/or precision because the sensors 116 have a greater combined FOV and thus, can detect the occupant within a larger portion of the area 100. For instance, as previously stated, with two sensors 116 there are portions of area 100 that are outside the FOV of the sensors 116 (e.g., portions 122 of FIG. 1B). These unmonitored portions, however, may be reduced (or even eliminated) if additional sensors 116 were installed, for example opposite the two existing sensors 116, in the area 100. In such a configuration, the combined FOV for all four sensors 116 would detect the occupant throughout the area 100, because no matter where the occupant was located within the area 100, thermal energy emitted by the occupant would be received by at least two sensors 116. In yet other configurations, several sensors 116 may be implemented in the area 100 to address obstructions in the FOV β for one or more sensors 116, such as interior walls or furnishings, which prevent one or more sensors 116 from receiving a thermal energy input from the occupant. In a more general sense, note that increasing the number of sensors within the area 100 improves the scalability (i.e., ability to monitor a greater portion of the area 100) and resolution because the system is configured to receive more thermal inputs for a given occupant through the additional sensors 116.

As can be seen, the system 300 may allow for communicative coupling with a network 304 and one or more servers or computer systems 308. The network 304 may also connect the sensor 116 and/or the computing system 308 with one or more controllers 324 (as described herein). The network 304 may be a wireless local area network, a wired local network, or a combination of local wired and wireless networks, and may further include access to a wide area network such as the Internet or a campus-wide network. In a more general sense, network 304 can be any communications network.

The computing systems 308 may be any suitable computing system capable of communicating over a network 304, such as a cloud-based or campus-based server computer, and may be programmed or otherwise configured to provide an occupancy detection related service, according to some embodiments. For example, as an occupancy detection related service the computing system 308 may be configured to determine a coordinate position for an occupant based on received occupant position data (e.g., detection signals from each sensor to the occupant, indicating distance from occupant to sensor when detection signals are available) and sensor position data. Numerous other such configurations will be apparent in light of this disclosure.

The computing system 308 may further include or otherwise be operatively coupled to a transceiver 312 that receives and transmits communication signals to facilitate the exchange of information between the computing system 308 and other devices of the occupancy detection system 300. Transceiver 312, for example, may be located within or otherwise operatively coupled with the computing system 308 and configured with standard technology to facilitate wired or wireless communication with one or more other transceivers located inside and/or outside the area 100. In some embodiments, the transceiver 312 is a modem, or other suitable circuitry that allows for transmitting and receiving data from a network, such as network 304. The communication signals may contain a variety of information, for example protocol information, pixel numbers, occupant position data, thermal images, and/or controller instructions/ commands. Once the sensor 116 has received and processed thermal energy to generate one or more digital signals, the sensor 116 may transmit these signals to the computing system 308. The computing system 308 may receive this information via network 304.

Upon receiving data from the sensors 116 and/or controllers 324, the transceiver 312 may transmit the data to one or more processors 316, which in turn are programmed or otherwise configured to compile and distribute instructions and data to operate controllers 324. For example, in some embodiments, the one or more processors 316 are configured to process received occupant position data derived from the sensor data, and to determine a coordinate position for the occupant. This coordinate position can be transmitted to one or more controllers via the network 304 to adjust one or more conditions within the area 100 (as described below). Alternatively, a decision can be made by the one or more processors as to what instruction to send to the network 304, based on the occupant coordinates. Any number of use cases will be apparent in light of this disclosure.

As can be seen, the computing system 308 further includes a memory 320 accessible by the one or more processors 316. The data received, created and/or managed by the processors 316 may be stored within a memory 320 to support various operations of the computing system 308. Memory 320 can be of any suitable type (e.g., RAM and/or ROM, or other suitable memory) and size, and in some cases may be implemented with volatile memory, non-volatile memory, or a combination thereof. Memory 320 may also be any physical device capable of non-transitory data storage, such as a computer program product that includes one or more non-transitory machine readable mediums encoding a plurality of instructions that when executed by one or more processors facilitate operation of an electronic device according to a process.

As can been seen, the computing system 308 is in communication with or otherwise operatively coupled to one or more controllers 324. The computing system 308, in some embodiments, is configured to generate and transmit instructions and/or commands to the controllers 324 via the communications network 304. An instruction or command is a set of routines, sub-routines or combination thereof, that are executable by one or more processors to operate one or more devices to achieve a desired condition or effect within the area 100. In response, the controllers 324 are configured to adjust lighting, environmental, and/or security conditions based on a coordinate position of an occupant within the area 100.

For example, a lighting controller 324A is configured to change or modify the lighting characteristics or functions of a light fixture. Lighting characteristics, such as light color or softness, may be adjusted based on the coordinate location of the occupant in the area 100. Similarly, lighting functions, such as turning on or off or dimming a light, may also be adjusted based on occupant location. The controller 324A may operate a single light fixture or multiple light fixtures depending on the configuration of the system 300. For instance, when the system 300 detects an occupant moving across the area 100, the system 300 may be configured to transmit instructions/commands to the controller 324A to turn on and off one or more light fixtures along a direction of travel for the occupant based on the coordinate position for the occupant. In some such embodiments, the controller 324A may also operate light fixtures in multiple areas (e.g., an adjoining room) based on the coordinate position of the occupant in the area 100. In such an instance, when the occupant nears an end of the area 100, the system may be configured to turn on one or more light fixtures within an adjacent room proximate to the occupant's coordinate position. As a result, when the occupant enters the adjacent room the light fixtures will already on and thus, allow the occupant to safely travel between areas of a given environment.

In other instances, the system 300 may also transmit occupancy information to one or more environmental controllers 324B. An environmental controller 324B is configured to change or otherwise adjust environmental characteristics, such as, heat, air conditioning, sound (i.e. music), and/or natural light (i.e. adjusting position of window treatments) based on the coordinate position of the occupant. For instance, when the system 300 detects the occupant entering the area 100, the system may be configured to command the controller 324B to increase the temperature of the area 100. In some such instances, the system 300 is configured to adjust an environmental characteristic based on the coordinate location of the occupant and a time delay (e.g., 30 seconds, one minute or two minutes), such that the environmental change is not activated when an occupant is merely passing through the area 100.

In some other instances, the system 300 may also transmit occupancy information to one or more security controllers 324C. A security controller 324C is configured to adjust and/or monitor changes to security characteristics or postures for the area 100, for example, locking doors and windows and/or activating and deactivating sensors. These characteristics may be adjusted based on the coordinate position of an occupant. For instance, when the system 300 detects that the occupant is leaving the area 100 based on a changing coordinate position and/or a coordinate position proximate to one or more access and egress locations (e.g., a doorway), the system 300 may be configured to command the controller 324C to unlock one or more doors and/or deactivate the security sensors for the area 100. No matter the particular use, the system 300 may determine a coordinate position for the occupant within the given area 100 using imaging-sensor techniques and methods. The system 300 may include other controllers 324 in addition to the controllers 324A, 324B, and 324C.

Methodology

Figure 4:
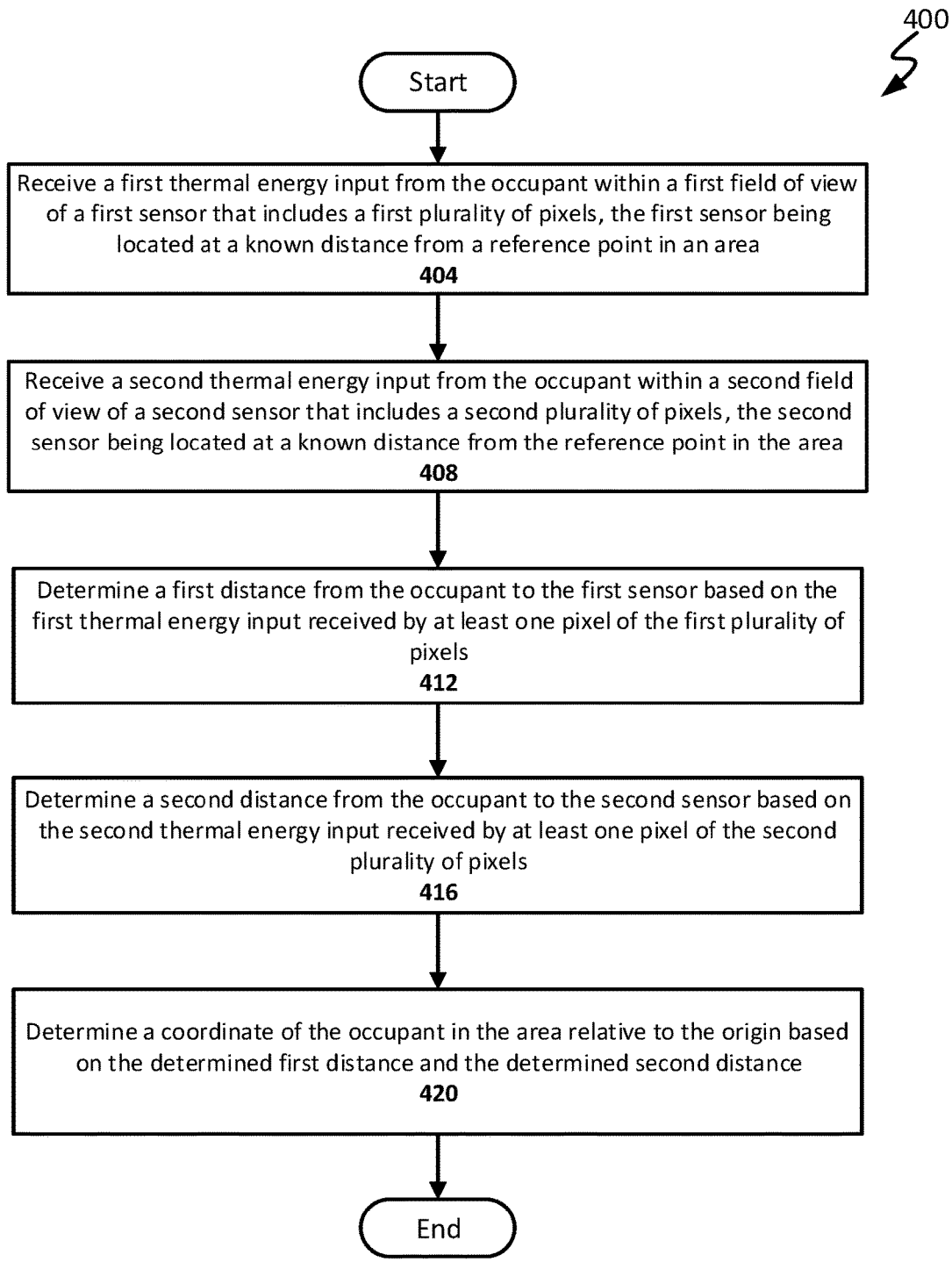
FIG. 4 is a flow chart of an example method for determining a coordinate position of an occupant in an area, in accordance with an embodiment of the present disclosure.

FIG. 4 is a flow chart of an example method 400 for determining a coordinate position of an occupant in an area, in accordance with an embodiment of the present disclosure. In general note that steps of the method 400 may be accomplished by one or more components of the system independently or in combination with one another. For instance, in an example embodiment, the sensors may be configured to receive the thermal energy inputs and determine the distances from each sensor to the occupant. A coordinate location of the occupant within the area, however, may be determined by the computing system in communication with the sensors using occupant position data from the sensors. In other embodiments, however, the sensors may be configured to receive the thermal energy inputs and transmit the detection signals to a computing system. The computing system in turn uses the received detection signals to determine the distances from each sensor to the occupant and a coordinate location for the occupant within the area. Other ways of implementing method 400 will be apparent in light of the present disclosure.

The method 400 includes receiving a first thermal energy input from an occupant within a first field of view of a first sensor that includes a first plurality of pixels, the first sensor being located a known distance from a reference point in an area in block 404. A thermal energy input is thermal energy emitted from the occupant and received by one or more pixels of the first sensor, as previously described. In a similar fashion, the method 400 also includes receiving a second thermal energy input from the occupant within a second field of view of a second sensor that includes a second plurality of pixels, the second sensor being located a known distance from the reference point in the area in block 408.

Figure 5A:
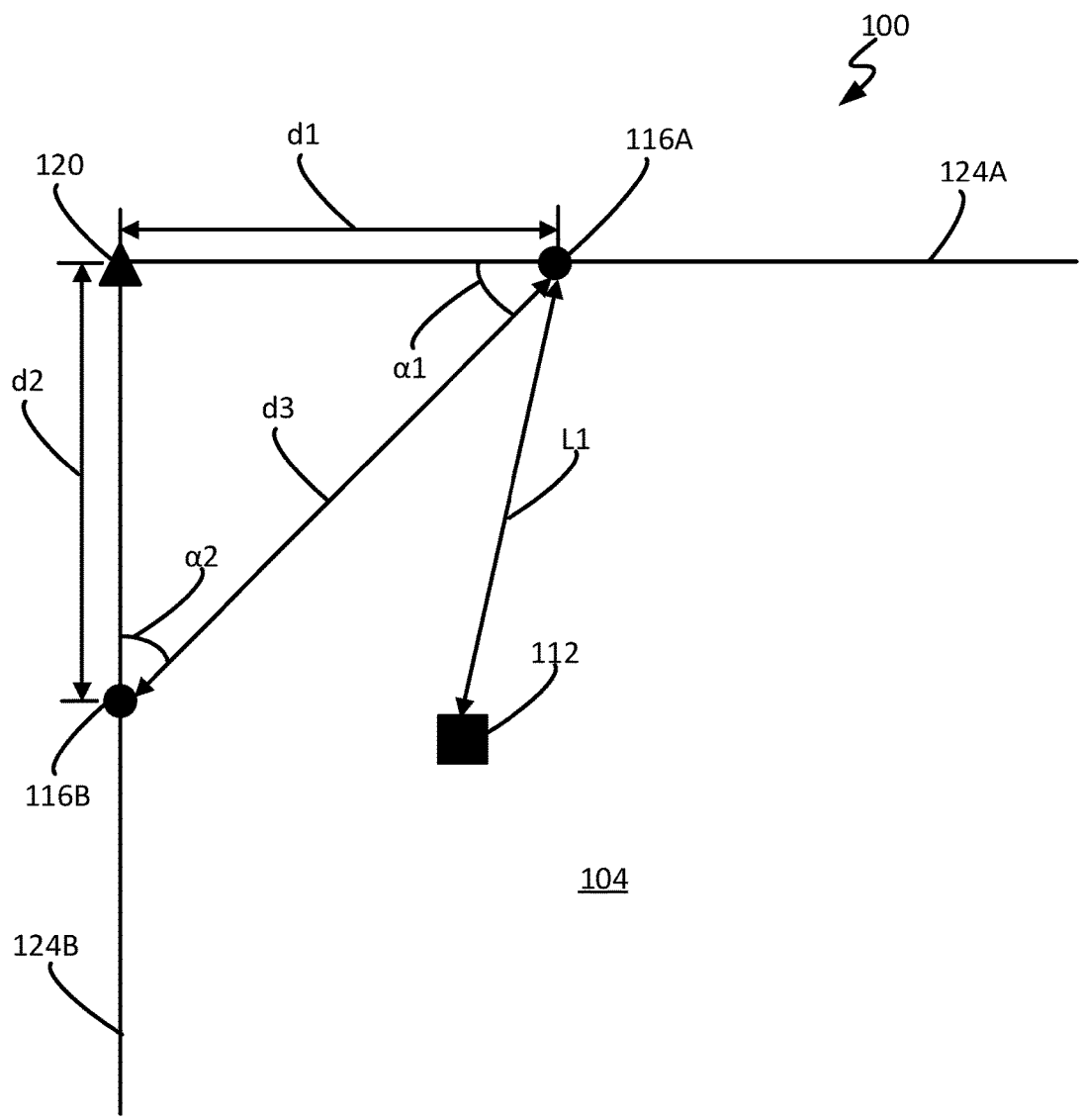
FIG. 5A is a schematic view of the area illustrating the arrangement of the sensors with respect to an origin, in accordance with an embodiment of the present disclosure.

As can be seen, method 400 further includes determining a first distance from the occupant to the first sensor based on the first thermal energy input received by at least one pixel of the first plurality of pixels in block 412. In an example embodiment, a first distance L1 between the first sensor 116A and the occupant 112 is calculated based on the position of the sensor 116A in relation to reference points and planes associated with the area 100, such as the origin 120 or reference axes 124. This is illustrated in FIG. 5A, in which the first sensor 116A and the second sensor 116B are located orthogonal to one another within the area 100. As can be seen, each sensor 116 is located a distance (i.e., d1 and d2) from the origin 120. Distances d1 and d2 can be measured and thus, are known values that can be programmed into the system for determining a distance (d3) between the sensors 116 using the following equation:

$$d3 = \sqrt{(d1^2 + d2^2)} \qquad \text{Equation 1}$$

The position of sensors 116 may also create angular relationships between one or more lines of sight from sensors 116 and one or more reference planes, such as axes 124. As can be seen in FIG. 5A, the mounting angle α is the angle between the line of sight between sensors 116 (i.e., a long distance d3) and axes 124. This angle may increase or decrease depending on the distance at which the sensors 116 are mounted on the wall away from the origin 120. With the sensors 116 positioned orthogonal to one another, the mounting angles α1 and α2 for each sensor can be determined using the following equations (in which sensor 116A is sensor 1 and sensor 116B is sensor 2):

$$\text{Sensor 1: } \alpha 1 = \arctan\frac{d2}{d1} \qquad \text{Equation 2}$$

$$\text{Sensor 2: } \alpha 2 = \arctan\frac{d1}{d2} \qquad \text{Equation 3}$$

Figure 5B:
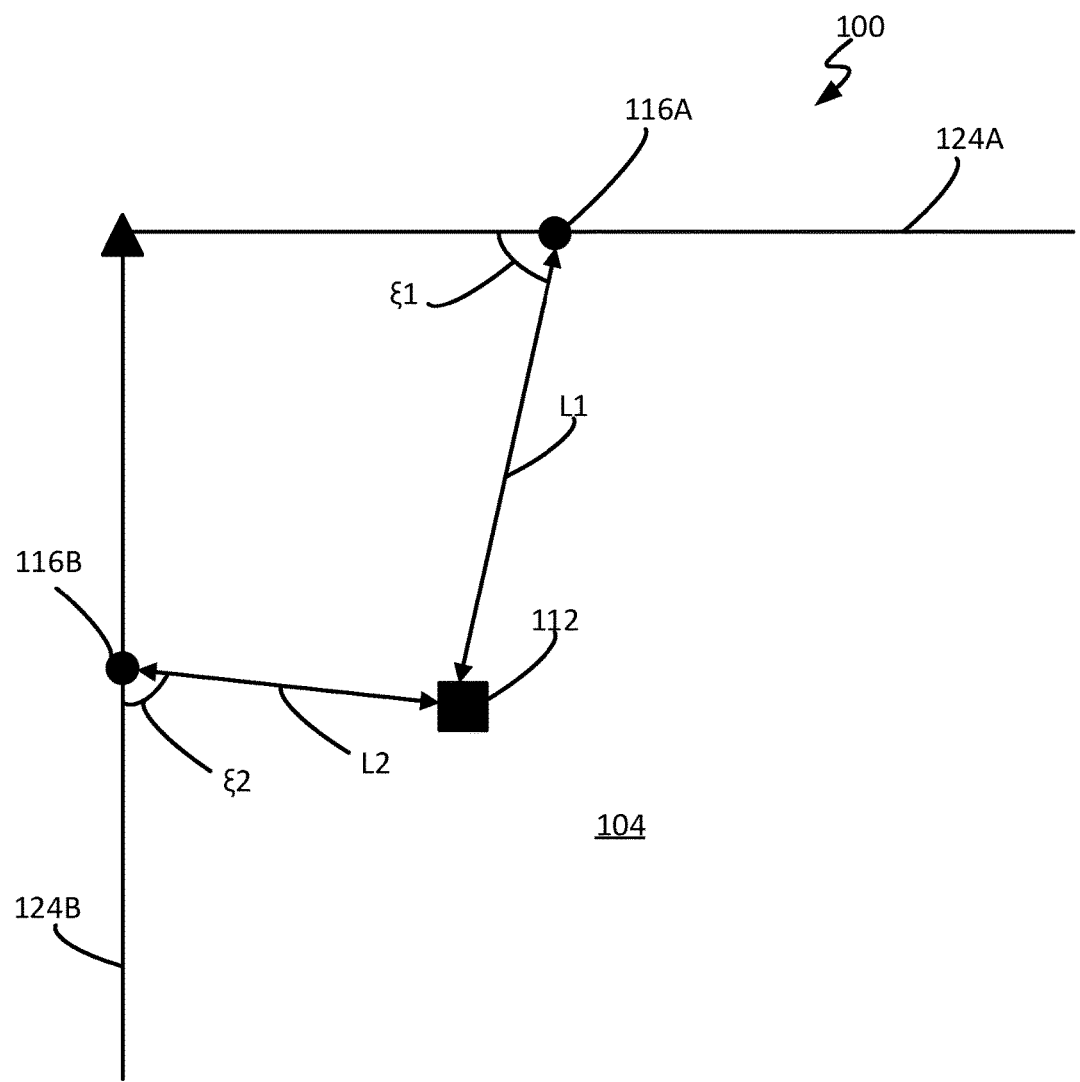
FIG. 5B is a schematic view of the area illustrating an arrangement of the sensors with respect to an occupant, in accordance with an embodiment of the present disclosure.

To determine distances L1 and L2 along the lines of sight from the occupant 112 to each sensor 116, sensors 116 (or a computing system) include a processor for determining azimuth angles ξ1 and ξ2 (collectively ξ), which in turn can be used to identify one or more offset angles ω, as described below. The azimuth angle ξ is the angle between reference axes 124 and the line of sight from the sensors 116 to the occupant 112. This is illustrated in FIG. 5B, in which azimuth angle ξ1 for sensor 116A is the angle from distance L1 to horizontal axis 124A. This angle is calculated based on FOV β, FOV per pixel γ and a pixel number n, for a selected sensor (e.g., sensor 116A or 116B) and in a chosen direction relative to the pixels of the sensor (e.g., the x-direction shown in FIG. 2), using the following equations:

$$\text{Sensor 1: } \xi(x1) = 90° - \frac{\beta(x1)}{2} + n(x1)\gamma(x1) \qquad \text{Equation 4}$$

$$\text{Sensor 2: } \xi(x2) = 90° - \frac{\beta(x2)}{2} + n(x2)\gamma(x2) \qquad \text{Equation 5}$$

As previously described, sensors 116 have a FOV βx and thus, are known values. Similarly, the FOV per pixel γ, in either direction, can be determined for each sensor 116 as previously described and thus, are also considered known values. The pixel number n, on the other hand, is not a known value, but rather determined based on the pixels receiving the thermal energy input from the occupant 112.

To determine a pixel number n, a pixel reference for the sensor 116 is selected. The pixel reference is used to identify a pixel location within the sensor 116 (e.g., the fourth pixel from the right-side of the sensor). In an example embodiment, the pixel reference is the right-hand side of the sensor 116. In other embodiments, however, the pixel reference may be selected as any point within the sensor to facilitate unique identification of each pixel within the sensor.

Figure 6:
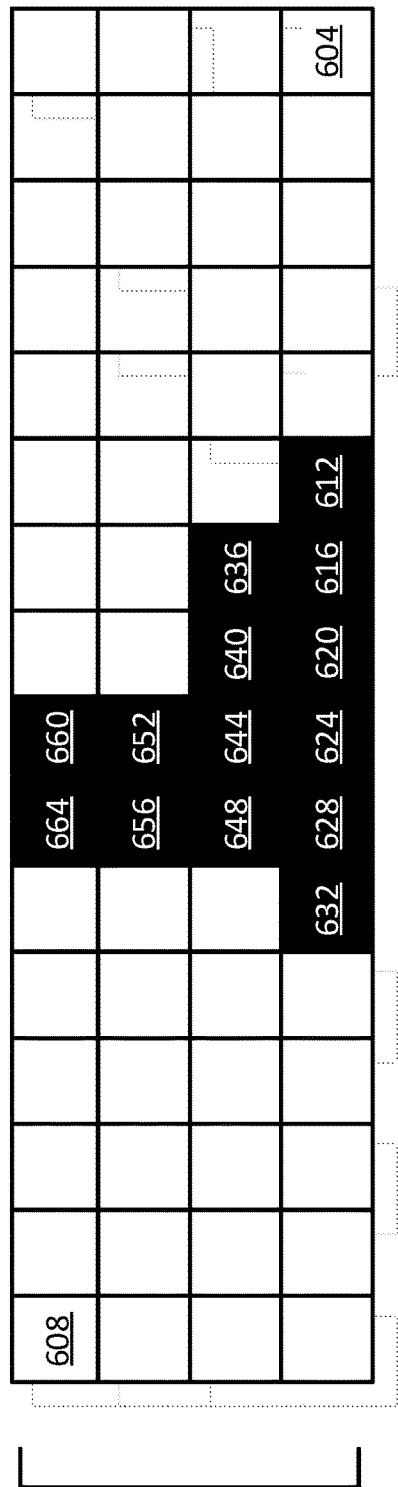
FIG. 6 is a front view of a sensor illustrating several pixels of the sensor detecting thermal energy emitted by an occupant within the area, in accordance with an embodiment of the present disclosure.

With a pixel reference selected, a pixel index can be created that uniquely identifies each pixel within the sensor 116 in relation to the pixel reference. This is illustrated in FIG. 6, in which, pixel 604 located at the lower right-hand corner of the sensor 116 is selected as pixel number 1 based on the proximity of the pixel to the right-hand side of the sensor 116 (i.e., the pixel reference). With pixel 604 identified as pixel number 1, the remaining pixels of the sensor 116 may be identified in accordance with the identification scheme. In this instance, the pixels are identified with a number (e.g., 1-64) going from right to left beginning with the bottom row and ending with the top row at the last pixel 608. When the sensor 116 detects an occupant, some of the pixels generate electrical signals in response to receiving thermal energy. In this instance, pixels 612 through 664 receive the thermal energy input from the occupant (as indicated by black shading). In response, the processor, in this example embodiment, is configured to select the pixel number associated with the pixel detecting the greatest amount of thermal energy. In other instances, the pixel number may be selected based on the pixel that generates the first digital signal or otherwise indicates receiving the input. Once selected, the pixel number along with FOV β and FOV per pixel γ, are used to determine the azimuth angle ξ, as previously described.

The pixel number, in some embodiments, is selected in response to analyzing the image recorded or otherwise processed by the sensor in response to the sensor receiving a thermal energy input. In such instances, a processor is configured to analyze the image using blob detection image processing techniques. In an example embodiment, the processor analyzes digital images by detecting regions in an image that differ in properties, such as brightness and color, compared to surrounding regions of the image. The processor is configured to select a pixel of the image that corresponds to a center of a blob within the image that represents the occupant. In response, the system is configured to identify a pixel of the sensor corresponding to the selected pixel of the image, and in turn selects a pixel number associated with the identified sensor pixel. The selected pixel number is used to determine azimuth angles ξ using the above equations.

Figure 7A:
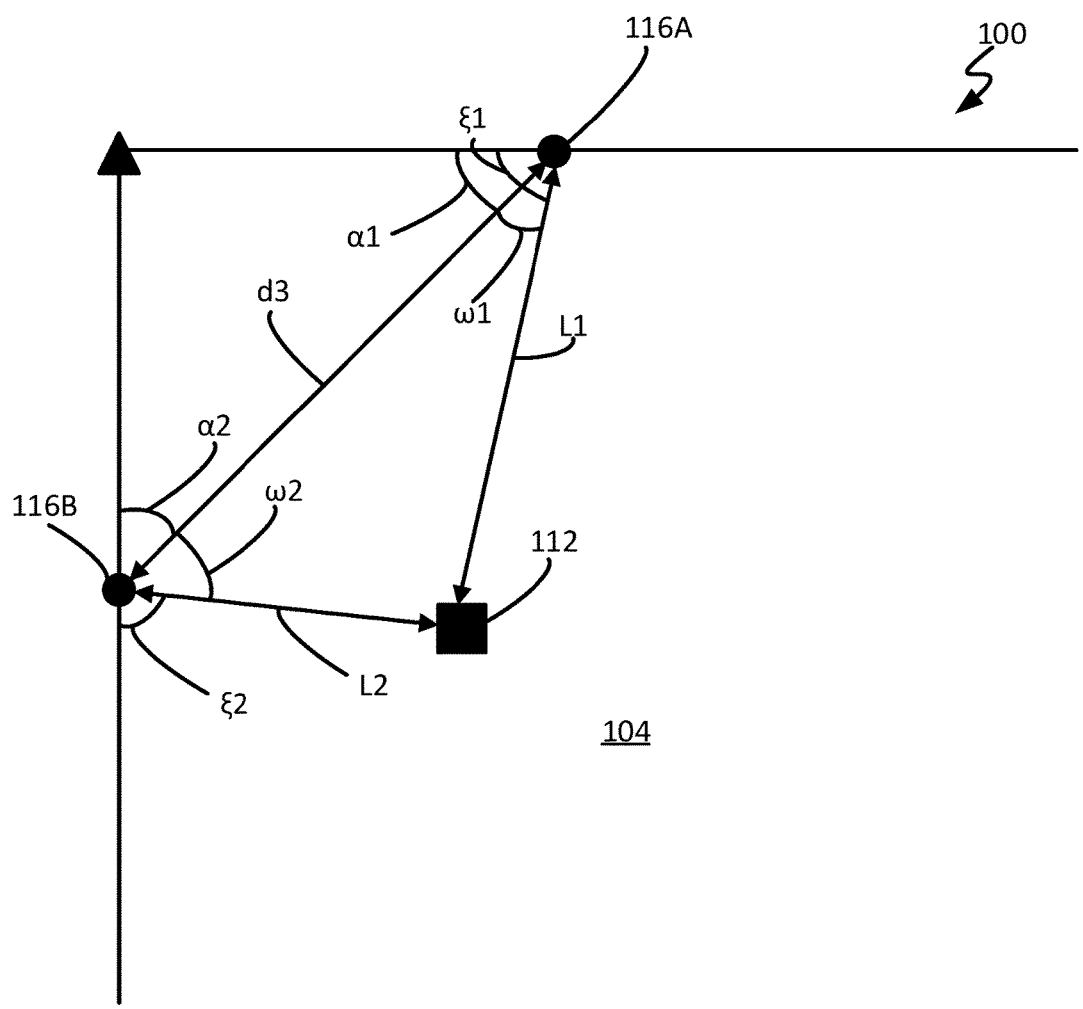
FIG. 7A is a schematic view of the area illustrating arrangement of the sensors in relation to one another and the occupant, in accordance with an embodiment of the present disclosure.

With the azimuth angle ξ determined, offset angles ω1 and ω2 (collectively ω) are calculated based on the position of the occupant 112 relative to both sensors 116. An offset angle ω is an angle from the line of sight between sensors 116 to the line of sight from the occupant 112 to one of the sensors 116. This is illustrated in FIG. 7A, in which ω1 is the angle between d3 and L1. The below conditions represent four possible occupant locations within the area 100 based on varying azimuth angles ξ.

| | |
|---|---|
| Condition #1: $0<\xi 1 \leq \alpha 1$ and $0<\xi 2<180-\alpha 2$ | Equation 6 |
| Condition #2: $0<\xi 1 \leq \alpha 1$ and $180-\alpha 2<\xi 2<180$ | Equation 7 |
| Condition #3: $\alpha 1<\xi 1 \leq 180$ and $0<\xi 2<180-\alpha 2$ | Equation 8 |
| Condition #4: $0<\xi 1 \leq \alpha 1$ and $180-\alpha 2<\xi 2<180$ | Equation 9 |

Conditions #1 and #4, however, can be disregarded for purposes of determining offset angles ω1 because these conditions correspond to occupant locations that are not within the FOV β of both sensors 116 and thus, the occupant is detected by a single sensor 116. Using conditions #2 and #3, the following equations can be derived for the first sensor 116A:

$$\omega(x1) = |\xi(x1) - \alpha(x1)| \quad \text{Equation 10}$$

With the offset angles determined for both sensors 116 in a given direction relative to the pixels of the sensors 116 (e.g., the x-direction shown in FIG. 2), a first distance L1 from the first sensor 116A to the occupant 112 can be determined using the following equations:

$$L(x1) = \frac{d(3)\tan\omega(x2)}{(\tan\omega(x1) + \tan\omega(x2))\cos\omega(x1)} \quad \text{Equation 11}$$

The method 400 further includes determining a second distance from the occupant to the second sensor based on the second thermal energy input received by at least one pixel of the second plurality of pixels in block 416. As previously described for sensor 116A, the second distance L2 is calculated based on physical relationships among the sensors 116 within the area 100, including distances and angles between sensors 116 and other reference points and/or planes. A process similar to the one previously described in relation to sensor 116A can be used to determine the distance L2 between the second sensor 116B and the occupant 112 using the following equations:

$$\omega(x2) = |180 - \xi(x2) - \alpha(x2)| \quad \text{Equation 12}$$

$$L(x2) = \frac{d(3)\tan\omega(x1)}{(\tan\omega(x1) + \tan\omega(x2))\cos\omega(x2)} \quad \text{Equation 13}$$

Figure 7B:
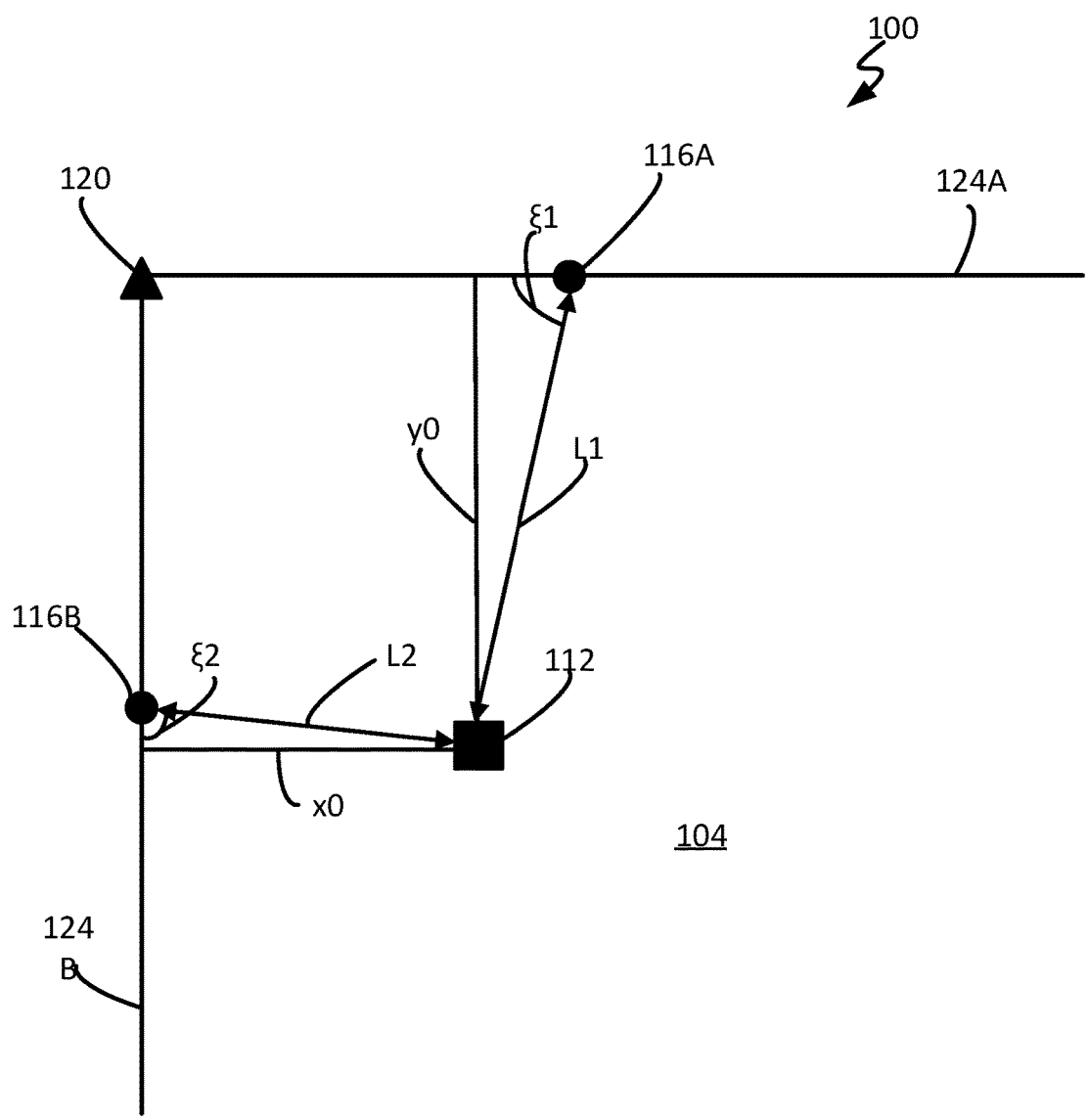
FIG. 7B is a schematic view of the area illustrating the coordinate position of the occupant, in accordance with an embodiment of the present disclosure.

The method 400 further includes determining a coordinate of the occupant in the area relative to the origin based on the determined first distance and determined second distance in block 420. This is illustrated in FIG. 7B, in which distances L1 and L2 from the occupant 112 to the sensors 116 are used to identify a coordinate position (x0, y0) of the occupant 112 within the floor 104 of area 100. Using the following equations, a coordinate position (e.g., (x, y)) for the occupant 112 relative to the origin 120 and in a direction relative to the pixels of the sensor (e.g., the x-direction shown in FIG. 2) can be determined.

$$x = L(x2) \times \sin \xi(x2) \quad \text{Equation 14}$$

FOV β$x$ $$y = L(x1) \times \sin \xi(x1) \quad \text{Equation 15}$$

Figure 8:
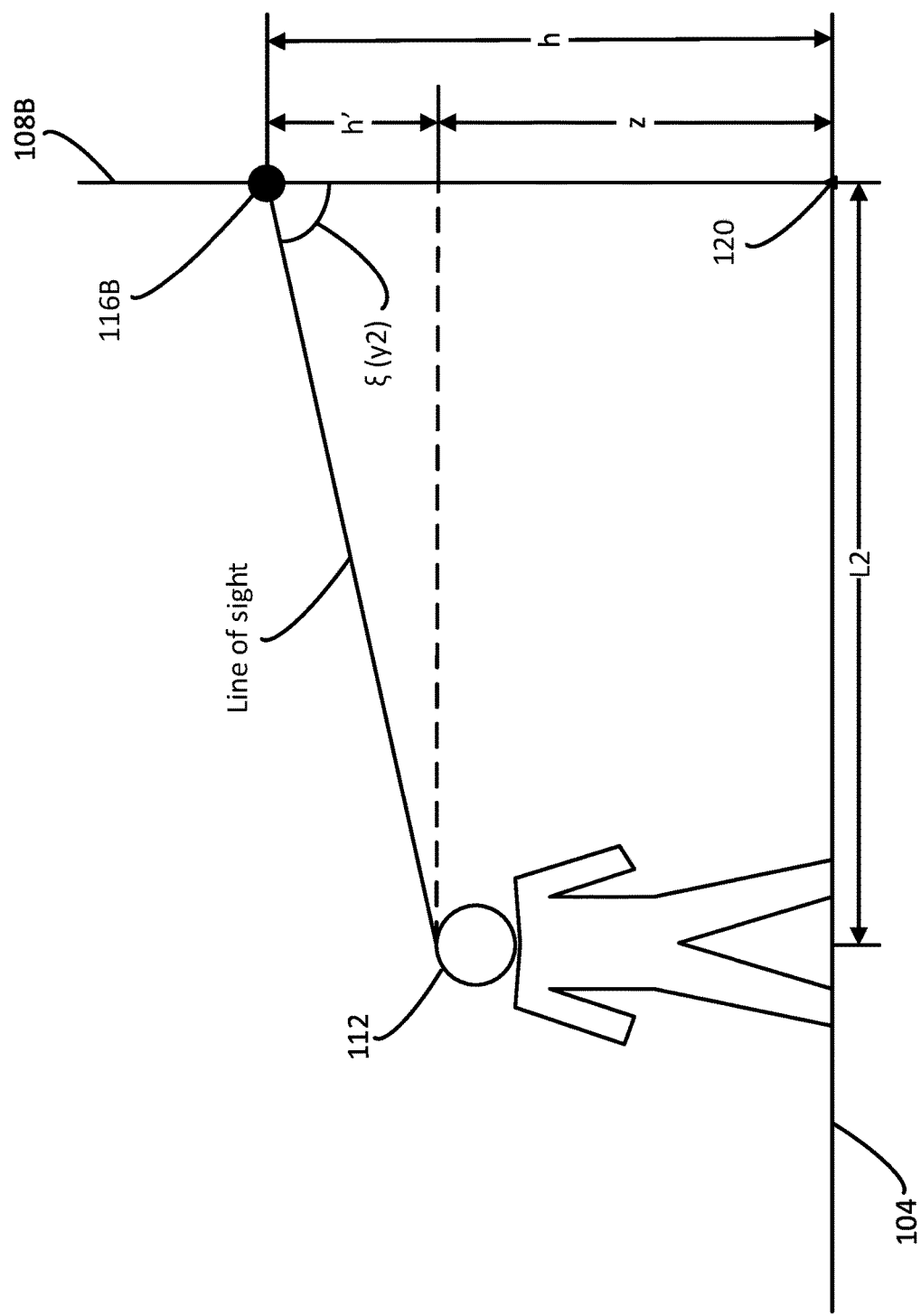
FIG. 8 is a side view of the area illustrating a sensor positioned above the floor and relative to an occupant, in accordance with an embodiment of the present disclosure.

FIG. 8 is a side view of the area illustrating a sensor positioned above the floor and relative to the occupant, in accordance with an embodiment of the present disclosure. In some embodiments, the system is further configured to determine a three-dimensional coordinate position (e.g., (x, y, z)) corresponding to an occupant position above the floor of the area. This coordinate position is determined relative to the origin of the area and in multiple directions relative to the pixels of the sensors 116 (e.g., x and y directions shown in FIG. 2). In an example embodiment, a processor is configured to determine a coordinate position of the occupant (e.g., (x, y) coordinates) relative to the origin, as previously described herein. The system is further configured to determine a z coordinate by calculating elevation angles $\xi(y1)$ and $\xi(y2)$ that define an angle of the sensor 116 relative to the wall 108 that supports the sensor 116. Elevation angles $\xi(y1)$ and $\xi(y2)$ are determined in relation to a line of sight from a sensor, for example sensor 116A or 116B, to a reference plane, such as walls 108A and 108B using the following equations. Note, that pixel numbers n(y1) and n(y2) can be determined using a pixel index and pixel reference that identifies the pixels of the sensor from the bottom pixels to the top pixels.

$$\text{Sensor \#1: } \xi(y1) = 90° - \frac{\beta(y1)}{2} + n(y1)\gamma(y1) \qquad \text{Equation 16}$$

$$\text{Sensor \#2: } \xi(y2) = 90° - \frac{\beta(y2)}{2} + n(y2)\gamma(y2) \qquad \text{Equation 17}$$

The occupant coordinate position (e.g., (x, y)) relative to the origin of the area 100 may be calculated using equations 14 and 15, as previously described. The coordinate position z of the occupant above the floor 104, as shown in FIG. 8, is calculated using the following equations:

$$z = h - h' \qquad \text{Equation 18}$$

When $$\text{Condition \#5 } 0 < \xi(y2) < 90 \qquad \text{Equation 19}$$

Or $$z = h + h' \qquad \text{Equation 20}$$

When $$\text{Condition \#6 } 90 \leq \xi(y2) < 180 \qquad \text{Equation 21}$$

The coordinate position z can be determined by calculating height h'. As can be seen in FIG. 8, height h' is the height from the occupant 112 to the sensor 116. In addition, height h' is in a direction relative to pixels of the sensor 116 (e.g., the y-direction shown in FIG. 2). In an example embodiment, height h' for second sensor 116B is determined based on the distance L2 between sensor 116B and the occupant 112, using the following equation. The height h' for the first sensor 116A can also be calculated in a similar fashion. With the height h' determined for each sensor 116, the distance z from the occupant 112 to each sensor 116 can be calculated. To improve accuracy of the three-dimensional coordinate position (e.g., (x, y, z)) corresponding to the occupant position, an average distance z' can be calculated using the distances z for each sensor.

$$\text{Sensor \#1: } h' = \frac{L(x1)}{|\tan\xi(y1)|} \qquad \text{Equation 22}$$

$$\text{Sensor \#2: } h' = \frac{L(x2)}{|\tan\xi(y2)|} \qquad \text{Equation 23}$$

The above methods were described in relation to determining a coordinate position for a single occupant within an area. The present disclosure, however, is not so limited. In other embodiments, the processor may be configured to determine coordinate positions for two or more occupants based on thermal energy inputs received by two or more sensors 116. In such an instance, the occupant position data can be evaluated based on, for example pixel number, distances from the occupant to the sensor, and sensor locations, to identify the determined first and second distances that correspond to a particular occupant among several detected occupants.

Alternative Configurations

Numerous other configurations will be apparent in light of this disclosure. For example, the system may include a number of different types of sensors, such as IR and acoustic sensors, in addition to the sensors, described herein. The system may include one or more different types of sensors to provide redundant detection methods for a given area (e.g., both infrared and thermal energy detection) or to reduce system costs. For instance, in portions of the given area where occupancy tracking is important (e.g., a high traffic area) the system may include more than one type of sensor to ensure that portion of the given area is sufficiently monitored. In other instances, system costs may be reduced by using less expensive sensors for different portions of the given area where occupant detection is less frequent and/or less important (e.g., an infrequently used secondary entry way). No matter the type of sensors deployed, the system may include a sufficient amount of sensors, such that each sensor monitors a portion of the given area (i.e., a coverage area) and thus, reducing the possibility of an occupant being undetected (i.e., passing through a blind spot). Coverage areas for a given sensor may vary depending sensor components and sensor types. A coverage area, for example, may be $1/10^{th}$, $1/16^{th}$, $1/32^{nd}$, or $1/64^{th}$ of the total area. These coverage areas along with an increased number of sensors allows the system to have greater occupant detection capabilities because the system can monitor more of the given area with fewer instances of occupants going undetected (i.e., less sensor blind spots).

In other embodiments, the sensors may include a camera for capturing human recognition information as part of occupant tracking processes. In such an instant case, the camera may be configured to capture images for identifying an individual within the given area. The camera may include, for example, complementary metal-oxide semiconductor (CMOS) or charged-couple device (CCD) image sensor for recording and/or processing images. Attributes, such as an individual's upper torso including shoulders, head, and face, can be captured in an image and processed by the sensor and/or the computing system. The image, in some embodiments, can be compared to one or more previously saved images stored in the computing system, a database, a server or a combination thereof, to determine a match with a known individual. Thus, the processor or computing system is configured not only to identify a specific coordinate position for an occupant in a given area, but also to identify the identity of that occupant.

In some other embodiments, multiple sensors may be variously located, for example staggered at different heights or locations along a wall, within the given area to improve system accuracy. For instance, in some embodiments the system is configured with two sensors located at the same horizontal location along a wall, but at different heights (i.e., staggered locations). Staggering the sensors at different heights provides improved system accuracy because two sensors having differing fields of view, but located at the same position, can more effectively monitor the given area than a single sensor located at that position. When two occupants, for example, enter the given area and are positioned such that a shorter occupant (e.g., a small child) is in front of a taller occupant (e.g., a parent), a single sensor may detect a single occupant (e.g., the parent) because the shorter occupant is outside the field of view for the single sensor (i.e., the child is located in the sensor's blind spot).

To remedy this problem, two sensors may be staggered at that location, such that the shorter occupant is detected by the lower sensor and the taller occupant is detected by the higher sensor. With the occupants detected, each sensor provides a detection signal that can be used by a processor or computing system (or some other suitable computing environment) to determine a distance to the occupant within their respective fields of view (e.g., the lower sensor determines a distance to the child and the higher sensor determines a distance to the parent). Both occupants, however, are detected by a third sensor located on a second wall adjacent to the first wall. The third sensor generates a third detection signal that can be used to detect and discern that two occupants are present within its field of view based on the pixels receiving thermal energy from both occupants. With the occupants detected, the processor/computing system determines a distance to each of the occupants. The coordinate location of each occupant within the given area is determined using occupant position data from all three sensors along with the methods previously described herein.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A method for locating an occupant within an area, the method comprising:
   receiving a first thermal energy input from the occupant within a first field of view of a first sensor, the first sensor being located a known distance from a reference point in the area;
   receiving a second thermal energy input from the occupant within a second field of view of a second sensor, the second sensor being located a known distance from the reference point in the area;
   determining a first distance from the occupant to the first sensor based on the first thermal energy input received by the first sensor, wherein determining the first distance further includes determining a first azimuth angle between a reference axis and a line of sight from the first sensor to the occupant based on:
   a field of view of the first sensor;
   a field of view of a pixel of the first plurality of pixels of the first sensor; and
   a pixel number assigned to the pixel in the first plurality of pixels;
   determining a second distance from the occupant to the second sensor based on the second thermal energy input received by the second sensor; and
   determining a coordinate position of the occupant in the area relative to the reference point based on the determined first distance and the determined second distance.

2. The method of claim 1, wherein:
   the first thermal energy input is received by at least one pixel in a first plurality of pixels of the first sensor; and
   the second thermal energy input is received by at least one pixel in a second plurality of pixels of the second sensor.

3. The method of claim 1, wherein the pixel number is assigned based on a position of the pixel in the first plurality of pixels receiving the thermal energy input.

4. The method of claim 1, wherein the first and second thermal energy inputs are simultaneously received within the first field of view of the first sensor and the second field of view of the second sensor, respectively.

5. The method of claim 1, further comprising tracking movement of the occupant in the area based on multiple determined coordinate positions.

6. The method of claim 1, further comprising providing an instruction to a controller in the area corresponding to the determined coordinate position of the occupant.

7. The method of claim 6, wherein the controller comprises at least one of a lighting controller, an environmental controller, and a security controller.

8. The method of claim 1, wherein determining a coordinate position of the occupant in the area relative to the reference point includes converting the determined first distance and the determined second distance to a coordinate position based on the first azimuth angle associated with the first sensor and a second azimuth angle associated with the second sensor.

9. A system for locating an occupant within an area, the system comprising:
   a first sensor positioned in an area and at a first location relative to a reference point in the area, the first sensor including a first field of view;
   a second sensor positioned in the area and at a second position relative to the reference point, the second sensor including a second field of view, such that the second field of view overlaps the first field of view;
   a computing system in communication with the first sensor and the second sensor, wherein the computing system is configured to:
   determine a first distance from the first sensor to the occupant based on detection signals from the first sensor, wherein determining the first distance further includes determining a first azimuth angle between a reference axis and a line of sight from the first sensor to the occupant based on:
   a field of view of the first sensor;
   a field of view of a pixel in the first plurality of pixels of the first sensor; and
   a pixel number assigned to the pixel of the first plurality of pixels,
   determine a second distance from the second sensor to the occupant based on detection signals from the second sensor, and
   determine a coordinate position of the occupant relative to the reference point based on the determined first distance and the determined second distance.

10. The system of claim 9, wherein the first sensor is positioned orthogonal to the second sensor.

11. The system of claim 9, wherein the first field of view and the second field of view overlap to define a portion of the area that contains the coordinate position.

12. The system of claim 9, further comprising a communication network connected to the first sensor and the second sensor and the computing system, wherein the first sensor and the second sensor are placed in communication with the computing system via the network.

13. A computer program product comprising one or more non-transitory machine readable mediums encoding a plurality of instructions that when executed by one or more processors cause a process to be carried out for determining a location of an occupant within an area, the process comprising:
- determining a first distance from the occupant to a first sensor based on a first thermal energy input received by the first sensor and a known location of the first sensor relative to a reference point within the area, wherein determining the first distance further includes determining a first azimuth angle between a reference axis and a line of sight from the first sensor to the occupant based on:
  - a field of view of the first sensor;
  - a field of view of a pixel in the first plurality of pixels of the first sensor; and
  - a pixel number assigned to the pixel of the first plurality of pixels;
- determining a second distance from the occupant to a second sensor based on a second thermal energy input received by the second sensor and a known location of the second sensor relative to the reference point, the first and second sensors being located at different locations within the area; and
- determining a coordinate position of the occupant in the area relative to the reference point based on the determined first distance and the determined second distance.

14. The computer program product of claim 13, wherein:
the first thermal energy input is received by at least one pixel in a first plurality of pixels of the first sensor; and
the second thermal energy input is received by at least one pixel in a second plurality of pixels of the second sensor.

15. The computer program product of claim 13, wherein the pixel number is assigned based on a position of the pixel of the first plurality of pixels receiving the thermal energy input.

16. The computer program product of claim 13, further comprising tracking movement of the occupant in the area based on multiple determined coordinate positions.

17. The computer program product of claim 13, further comprising providing an instruction to a controller in the area corresponding to the determined coordinate position of the occupant, wherein the controller comprises at least one of a lighting controller, an environmental controller, and a security controller.

18. The computer program product of claim 13, wherein determining the coordinate position of the occupant in the area relative to the reference point includes converting the determined first distance and the determined second distance to a coordinate position based on the first azimuth angle associated with the first sensor and a second azimuth angle associated with the second sensor.

* * * * *